J. SMEDMAN.
BELT SHIFTER.
APPLICATION FILED OCT. 24, 1914.
1,140,773.
Patented May 25, 1915.
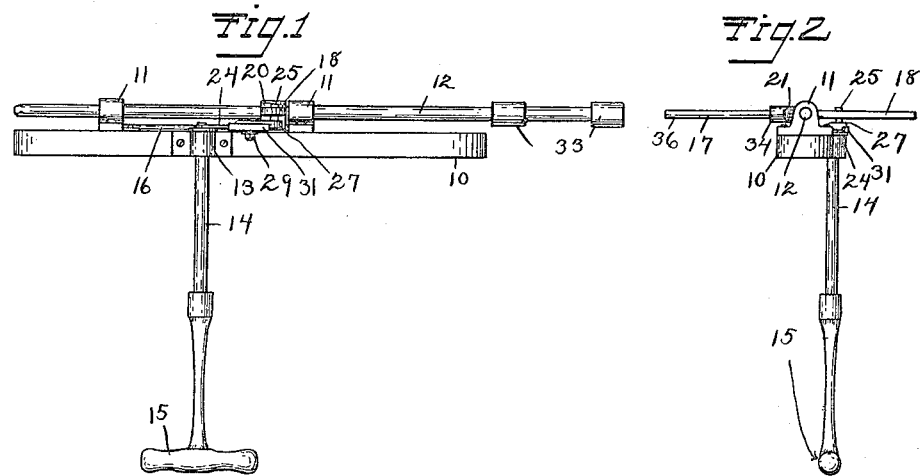
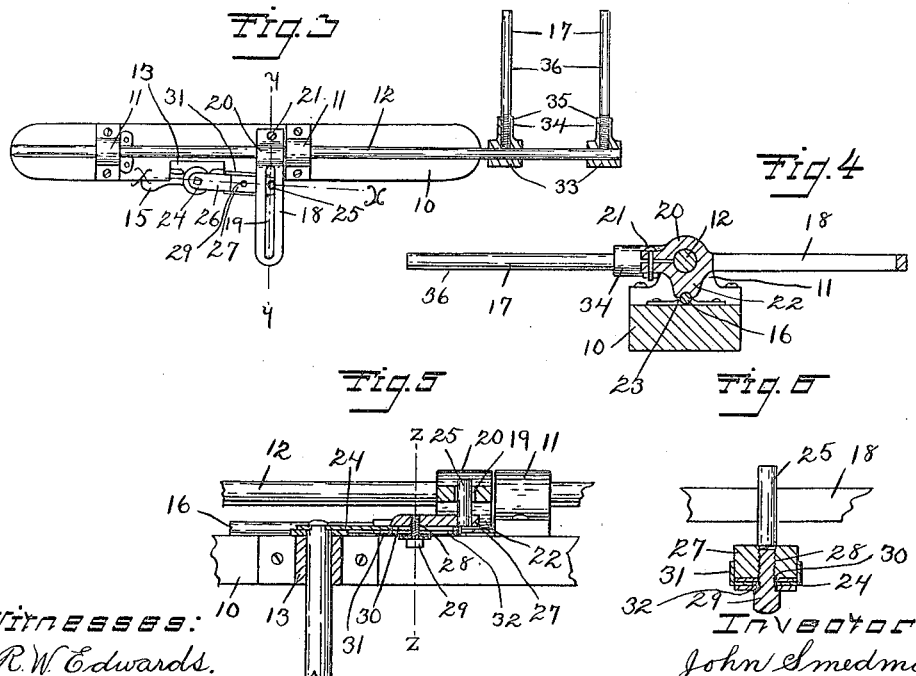

UNITED STATES PATENT OFFICE.

JOHN SMEDMAN, OF FORESTVILLE, CONNECTICUT, ASSIGNOR OF ONE-THIRD TO PATRICK ENGELWOOD, OF BRISTOL, CONNECTICUT.

BELT-SHIFTER.

1,140,773.

Specification of Letters Patent.

Patented May 25, 1915.

Application filed October 24, 1914. Serial No. 868,482.

*To all whom it may concern:*

Be it known that I, JOHN SMEDMAN, a citizen of the United States, residing at Forestville, in the county of Hartford and State of Connecticut, have invented certain new and useful Improvements in Belt-Shifters, of which the following is a specification.

My invention relates to improvements in belt shifters, and the object of my improvement is simplicity and economy in construction and convenience and efficiency in use.

In the accompanying drawing:—Figure 1 is a front elevation of my improved belt shifter. Fig. 2 is an end elevation of the same. Fig. 3 is a plan view of the same. Fig. 4 is a sectional view on the line $y$—$y$ of Fig. 3. Fig. 5 is a sectional view on the line $x$—$x$ of Fig. 3. Fig. 6 is a sectional view on the line $z$ $z$ of Fig. 5.

My improved belt shifter comprises a base board 10 on the face of which are mounted horizontal slide bearings 11 for a sliding rod 12 and on one edge of which is mounted a vertical bearing 13 for a handle shaft 14, having at the lower end a handle 15. Between the slide bearings 11 and also mounted on the face of the board 10, and parallel with the sliding rod 12 is a fixed rod 16. The sliding rod 12 overhangs the bearings 11 at one end and is provided with a pair of radial arms 17 suitable for engaging with the belt to be shifted. On the sliding rod 12, between the bearings 11, is mounted a laterally extending arm 18 having a radial slot 19. The said arm is secured to the sliding rod 12 by means of a hub portion 20 that is split on the rear side, the two parts of the split portion being adjustably secured together by means of a pinching screw 21. On the lower side of the hub portion 20 is a lug 22 having a slot 23 open on the lower side which is a sliding fit for and engaged with the fixed rod 16, which latter serves as a guide rod therefor. The open slot 23 and the guide rod 16 coöperate to position the arm 18 in a generally horizontal plane, at all positions throughout which the same may be moved with the sliding rod 12 on which it is mounted.

The upper end of the handle rod 14 extends slightly above the bearing 13 and is provided with a radially extending arm 24, having an upwardly extending pin 25 at the upper end that is a fit for and is engaged with the radial slot 19 in the arm 18.

Rotating the handle rod or shaft 14 by means of the handle 15 serves to move the sliding rod 12 along the bearings 11 and thereby shift the belt engaged with the belt engaging arms 17 by reason of the engagement of the pin 25 with the slot 19.

The arm 24 is made adjustable as to length in the following manner. The said arm is made up of an inner part 26 engaged with the handle shaft 14 and an outer part 27 on which is mounted the pin 25, the said parts having overlapping ends. The outer part 27 as shown is uppermost, and is provided with a threaded hole 28 for the screw 29. The inner and lower part 26 is provided with a slot 30 in registration with the hole 28. A channel piece 31 lies along the lower side of the lower part 24, has a slot 32 in registration with the slot 30 and hole 28, and has the side flanges extending along the edges of the overlapping ends of the two parts 26 and 27. The screw 29 extends through the slots 30 and 32 and is engaged with the hole 28, and serves to secure the parts 26 and 27 in their adjusted positions, the body portion of the screw 29 being a sliding fit for the said slots.

The belt engaging arms 17 comprise a hub portion 33 that has a hole that is a sliding fit for the rod 12, and a boss 34 extending radially from the said hub portion 33, and having a threaded radial hole 35, an arm proper 36, the inner end of which is threaded to fit the said threaded hole 35. The radial hole 35 extends through the boss 34 and through the side wall of the hub portion 33 and the threaded inner end of the arm proper 36 is suitably formed to permit the extreme or tip end of the arm portion 36 to bear against the rod 12 and serve as a set screw to bind the arm 17 in any position desired along the rod 12, and also to hold the arm in any desired radial position.

The threaded hole 35 for one arm 17 is made right handed and for the other arm 17 is made left handed, and the said arms are interchangeable in their positions, so that the said arms may be so positioned relatively to the belt that the action of the belt in contacting with the same will tend to tighten the same instead of loosening the same.

I claim as my invention:—

1. A belt shifter comprising a rod slidably mounted, and having belt engaging arms, a laterally extending arm mounted on the said rod and provided with a slot, a handle rod operatively mounted in a plane at right angles to the said rod and having a radial arm, a pin on the said radial arm engaged with the said slot, and the said radial arm being composed of an inner portion and an outer portion having overlapping ends, one of the said ends having a hole for a screw, the other of the said ends having a slot in registration with the said hole, a channel piece extended along the said other end, having a slot in registration with the said first slot and hole, and having sides engaged with the edges of the said ends, and a screw passing through the said slots and engaged with the said hole.

2. A belt shifter comprising a rod slidably mounted, belt engaging arms mounted on the said rod, and means for moving the said rod, the said arms comprising a hub portion, slidably mounted on the said rod, and having a boss, the said boss being provided with a radial threaded hole extending through the side wall of the said hub, an arm proper suitable for engaging with a belt, and having a threaded portion at the inner end, the said threaded portion fitting the said threaded hole, and the said threaded portion being suitably formed to permit the extreme inner end of the said arm proper to engage with the said rod.

JOHN SMEDMAN.

Witnesses:
PATRICK ENGELWOOD,
LOUIS M. SCHMIDT.

Copies of this patent may be obtained for five cents each, by addressing the "Commissioner of Patents, Washington, D. C."